United States Patent
Krasniqi

(10) Patent No.: US 12,432,661 B2
(45) Date of Patent: Sep. 30, 2025

(54) DYNAMIC CLOSED LOOP POWER CONTROL USING A NOMINAL TARGET VALUE

(71) Applicant: T-MOBILE INNOVATIONS LLC, Overland Park, KS (US)

(72) Inventor: Gezim Krasniqi, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 455 days.

(21) Appl. No.: 17/960,322

(22) Filed: Oct. 5, 2022

(65) Prior Publication Data
US 2024/0121721 A1 Apr. 11, 2024

(51) Int. Cl.
*H04W 52/08* (2009.01)
*H04B 17/318* (2015.01)
*H04B 17/336* (2015.01)
*H04B 17/345* (2015.01)

(52) U.S. Cl.
CPC .......... *H04W 52/08* (2013.01); *H04B 17/318* (2015.01); *H04B 17/336* (2015.01); *H04B 17/345* (2015.01)

(58) Field of Classification Search
CPC ... H04W 52/08; H04W 52/10; H04W 52/146; H04W 52/241; H04W 52/245; H04B 17/318; H04B 17/336; H04B 17/345
USPC .......................................................... 455/522
See application file for complete search history.

(56) References Cited

U.S. PATENT DOCUMENTS

| | | | |
|---|---|---|---|
| 2010/0046479 A1* | 2/2010 | Sampath | H04W 52/243 370/335 |
| 2013/0190035 A1* | 7/2013 | Wang | H04W 52/241 455/522 |
| 2017/0055229 A1* | 2/2017 | Klockar | H04W 52/12 |
| 2017/0245218 A1* | 8/2017 | Nama | H04W 52/241 |
| 2022/0132429 A1* | 4/2022 | Vu | H04B 17/336 |
| 2022/0303045 A1* | 9/2022 | Lee | H04L 1/0009 |

* cited by examiner

*Primary Examiner* — Don N Vo
(74) *Attorney, Agent, or Firm* — SHOOK, HARDY & BACON L.L.P.

(57) ABSTRACT

Aspects provided herein provide methods, systems, and a non-transitory computer storage media storing computer-useable instructions for dynamic closed loop power control. The method begins with a base station receiving an uplink message from at least one user equipment (UE) device. Next, the signal strength of the uplink message is measured. The signal strength of the uplink message is then compared with a first nominal target value. Based on the comparison, the first nominal target value can be adjusted to a second nominal target value. The nominal target value may be a P0 nominal physical uplink shared channel (P0 nominal PUSCH).

17 Claims, 5 Drawing Sheets

DYNAMIC CLOSED LOOP POWER CONTROL USING A NOMINAL TARGET VALUE

BACKGROUND

Uplink power control is used in 5G and other wireless system to determine the transmit power used by a wireless device, or user equipment (UE) to transmit uplink messages to the base station, such as a gNodeB (gNB). The transmit power of the UE often needs to increase or decrease to meet network operating parameters, including signal-to-noise and interference (SINR) and bit error rate (BER). Transmit power can be increased to meet SINR or BER at the base station. Decreases in transmit power are used to minimize co-channel interference in the network. In wireless networks a significant challenge is adapting the transmit signal of the UE to overcome variations in signal condition on the channel. Transmit power can be varied within network parameters as channel quality changes in order to provide a fixed data rate. Uplink power control can be used to maintain a constant SINR at the base station. A P0 nominal physical uplink shared channel (P0 nominal PUSCH) value is used in determining uplink transmit power for each UE. A constant value is currently used, which can adversely affect both the base station and the UE. Dynamically adjusting the P0 nominal PUSCH value improves network performance and utilization while also improving UE battery life.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for dynamic closed loop power control are provided. The method begins with a base station receiving an uplink message from at least one user equipment (UE). Next, the signal strength of the uplink message from the at least one UE is measured. The signal strength of the uplink message is then compared with a first nominal target value. Based on the comparison, the first nominal target value is adjusted to a second nominal target value. The nominal target value may be a P0 nominal physical uplink shared channel (PUSCH).

In a further embodiment, a system for dynamic closed loop power control is provided. The system includes a base station with one or more antennas. The antennas receive uplink messages from at least one user equipment (UE) and transmit data and commands from the base station. The system also includes a processor. The processor is configured to receive at least one uplink message from at least one UE. The processor is also configured to measure at least one signal strength from the at least one uplink message. Next, the processor compares the at least one signal strength from the uplink message with a first nominal target value. The first nominal target value can then be adjusted to a second nominal target value based on the comparison.

An additional embodiment provides a non-transitory computer storage media storing computer-useable instructions that, when executed by one or more processors cause the processors to transmit an uplink message from a user equipment (UE) to a base station. The uplink message can contain a signal strength. After processing by the base station, the UE receives a downlink message containing a power command, the power command based on the adjustment of a first nominal value to a second nominal target value.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
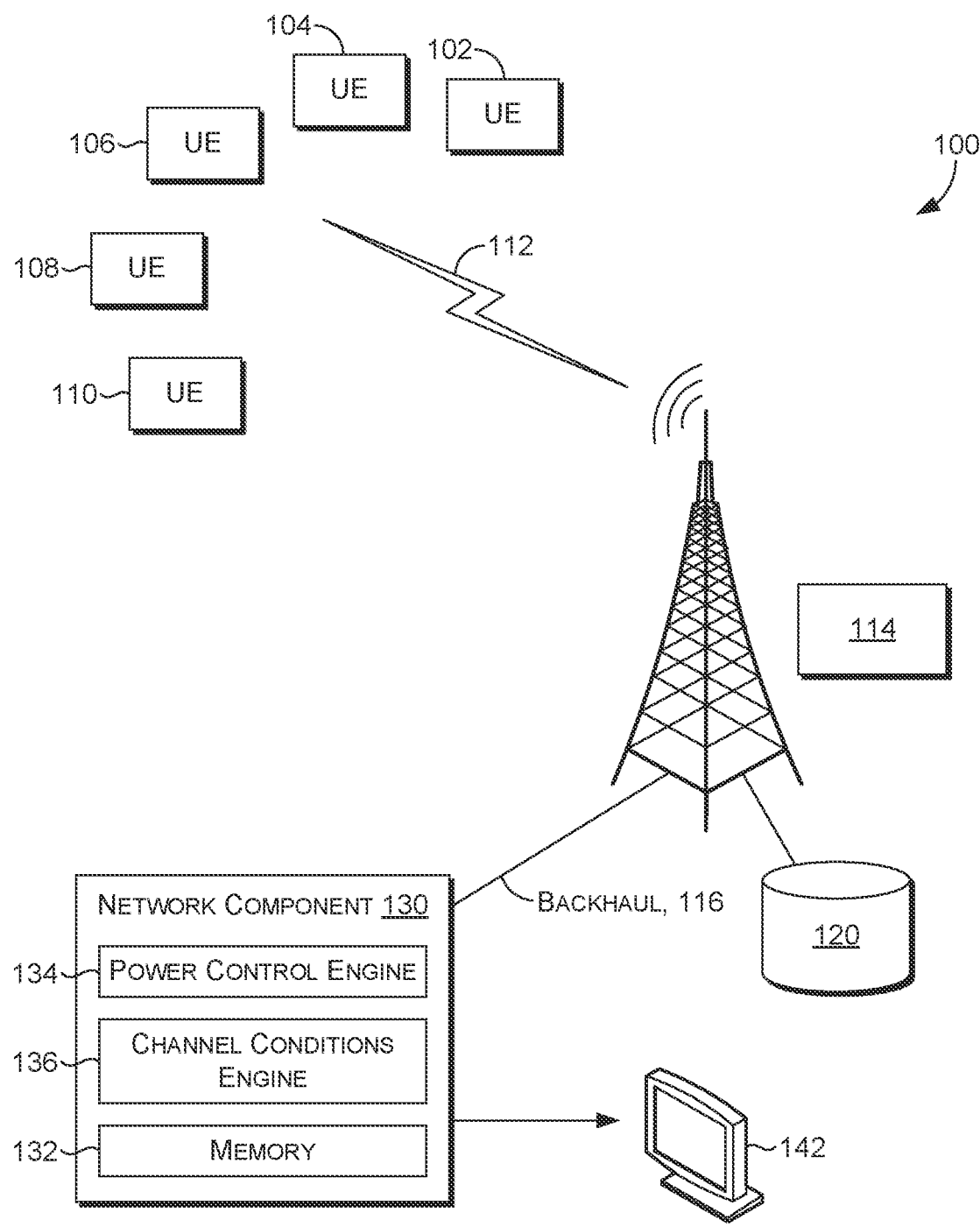
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Received Power
RSRQ Reference Signal Received Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast are for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for dynamic closed loop power control using a nominal target value is provided. The method begins with receiving an uplink message from at least one user equipment (UE). The uplink message can be sent to a base station. The method continues with measuring a signal strength of the uplink message from the at least one UE device. The signal strength from the uplink message is then compared with a first nominal target value. Based on the comparison, the first nominal target value may be adjusted to a second nominal target value, which in turn can result in a power increase/decrease command to the UE to change transmit power level.

A second aspect of the present disclosure provides a system for dynamic closed loop power control using a nominal target value. The system includes a base station with one or more antennas and also includes a processor. The processor is configured to receive at least one uplink message from at least one user equipment (UE). The processor also measures at least one signal strength from the at least one uplink message. The signal strength measurement is then compared with a first nominal target value. The first nominal target value is selected to ensure that decoding in both uplink and downlink directions is possible under the signal conditions of the uplink message. Based on the comparison of the at least one signal strength to the first nominal target value, the first nominal target value can be adjusted to a second nominal target value. The nominal target value may be a P0 nominal physical shared channel (P0 nominal PUSCH).

Another aspect of the present disclosure is directed to a non-transitory computer storage media storing computer-useable instructions that, when used by one or more processors, cause the processors to transmit an uplink message from a user equipment (UE) to a base station. The uplink message can include a signal strength. After processing, the UE can receive a downlink message containing a power command, with the power command based on adjusting a first nominal target value to a second nominal target value.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement.

Network environment 100 includes user equipment (UE) devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (500) that communicates via wireless communications with the base station 114 in order to interact with a public or private network.

Figure 5:
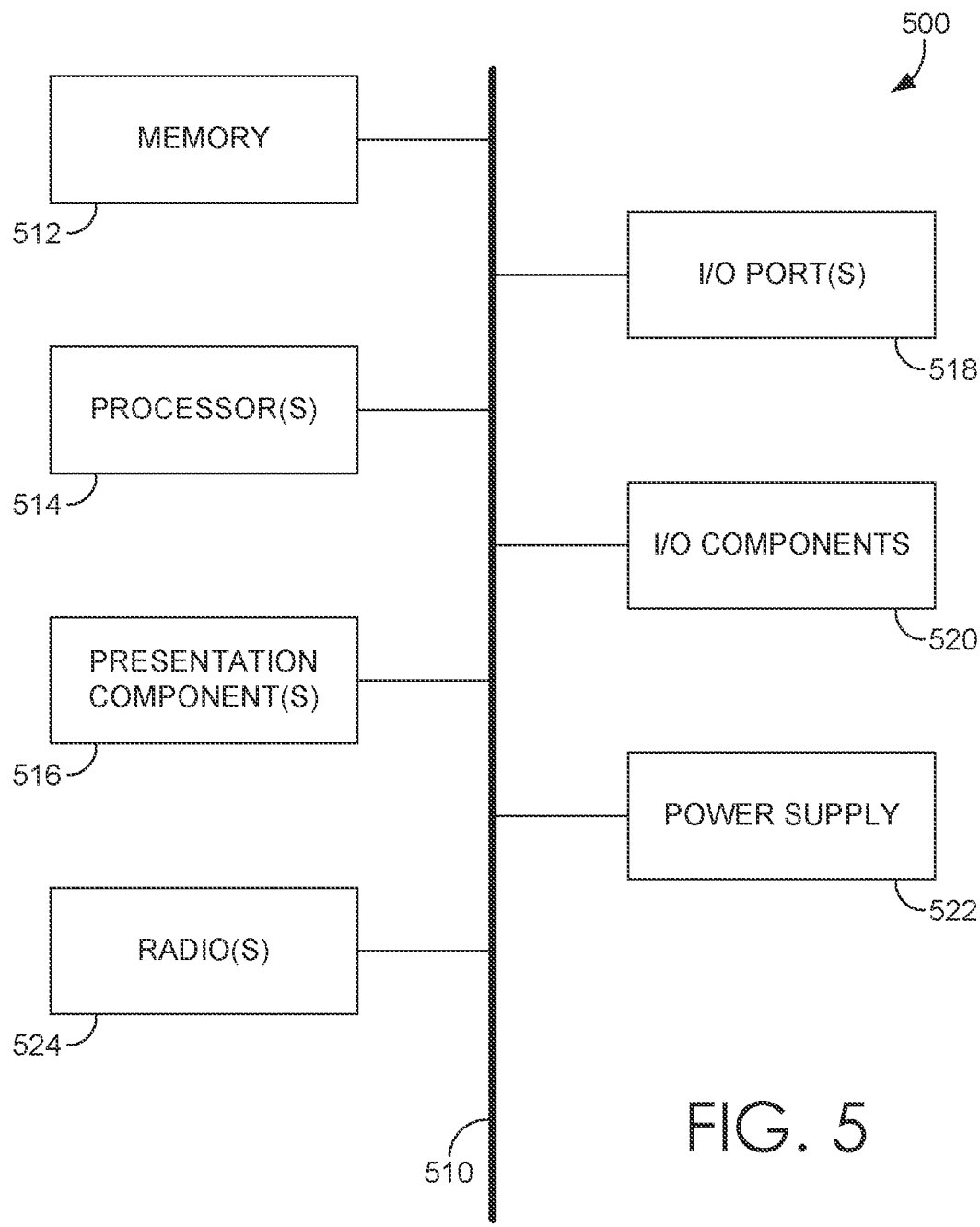
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a power control engine 134, and a channel conditions engine 136. All determinations, calculations, and data further generated by the power control engine 134 and the channel conditions engine 136 may be stored at the memory 132 and also at the data store 140. Although the network component 130 is shown as a single component comprising the memory 132, the power control engine 134, and the channel conditions engine 136, it is also contemplated that each of the memory 132, power control engine 134, and channel conditions engine 136 may reside at different locations, be its own separate entity, and the like, within the home network carrier system.

The network component 130 is configured to retrieve signal information, UE device information, latency information, including quality of service (QoS) information, and metrics from the base station 114 or one of the UE devices 102, 104, 106, 108, and 110. UE device information can include a device identifier and data usage information. The channel conditions engine 136 can receive signal condition measurements and power levels from the UEs 102, 104, 106, 108, and 110. The channel conditions engine 136 can be located in a central office or other centralized location for a virtualized radio access network. For a distributed radio access network, the channel conditions engine 136 can be located at the base station 114. The base station 114 may be a gNodeB that interfaces with the channel conditions engine 136 and the power control engine 134.

The base station 114 sets a P0 nominal PUSCH for closed loop power control using the channel conditions engine 136 and the power control engine 134. The channel conditions engine 136 that uses the information to determine if the P0 nominal PUSCH should be adjusted. The power control engine 134 determines if the UEs currently using the base station 114 should be given power control commands to adjust their transmit power. The P0 nominal PUSCH is a single parameter that can be set for each cell in a network. It is the target level that the base station wants to receive per resource block. The level of the P0 nominal PUSCH value represents the level of signal strength that ensures the SINR is above the noise level, thus allowing successful decoding by the base station and the UE. The P0 nominal PUSCH value is set at the base station and may be based on historical data on channel conditions for the cell served by the base station. A constant P0 nominal PUSCH is not optimal for the cell served by the base station. When the noise level is high, such as when many UEs are active in the cell, interference is also high. When the noise level in a cell is high, a higher P0 nominal PUSCH can be needed.

The value for the P0 nominal PUSCH is set for the base station and may be adjusted remotely or by a technician physically present at the base station. Because of this, the P0 nominal PUSCH value may be set to compensate for higher noise levels than may be needed most often at the location of the base station. Aspects discussed herein provide for dynamically adjusting the value of the P0 nominal PUSCH based on the noise level measured at the base station. The UE then adjusts its own power level based on the P0 nominal PUSCH value. Dynamically adjusting the P0 nominal PUSCH controls system interference and allows UEs to use lower transmit power, thus extending battery life.

Figure 2:
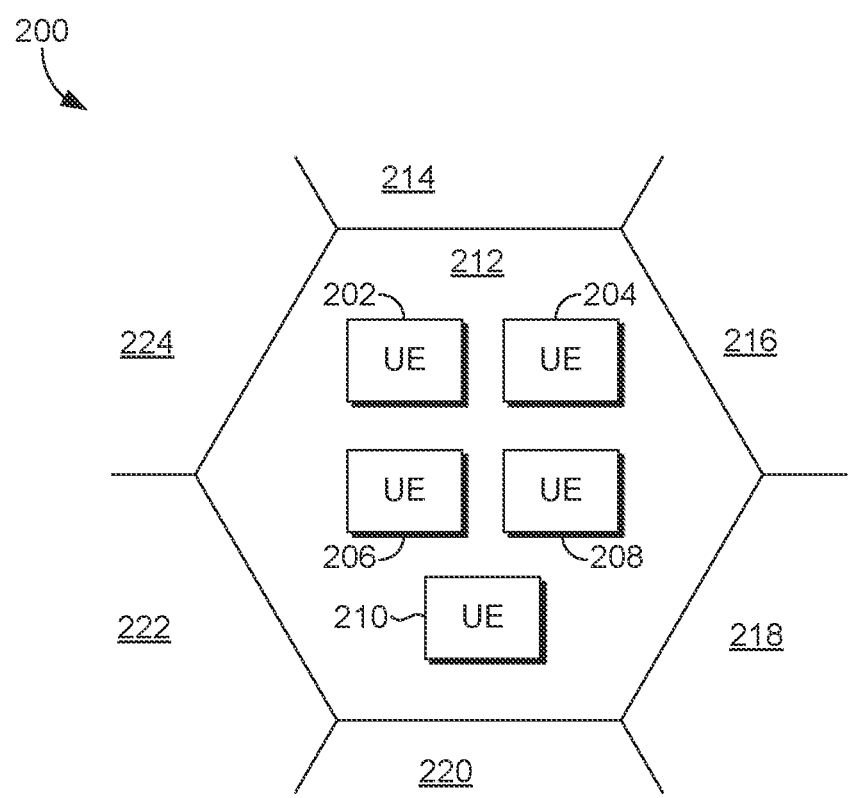
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Figure 3:
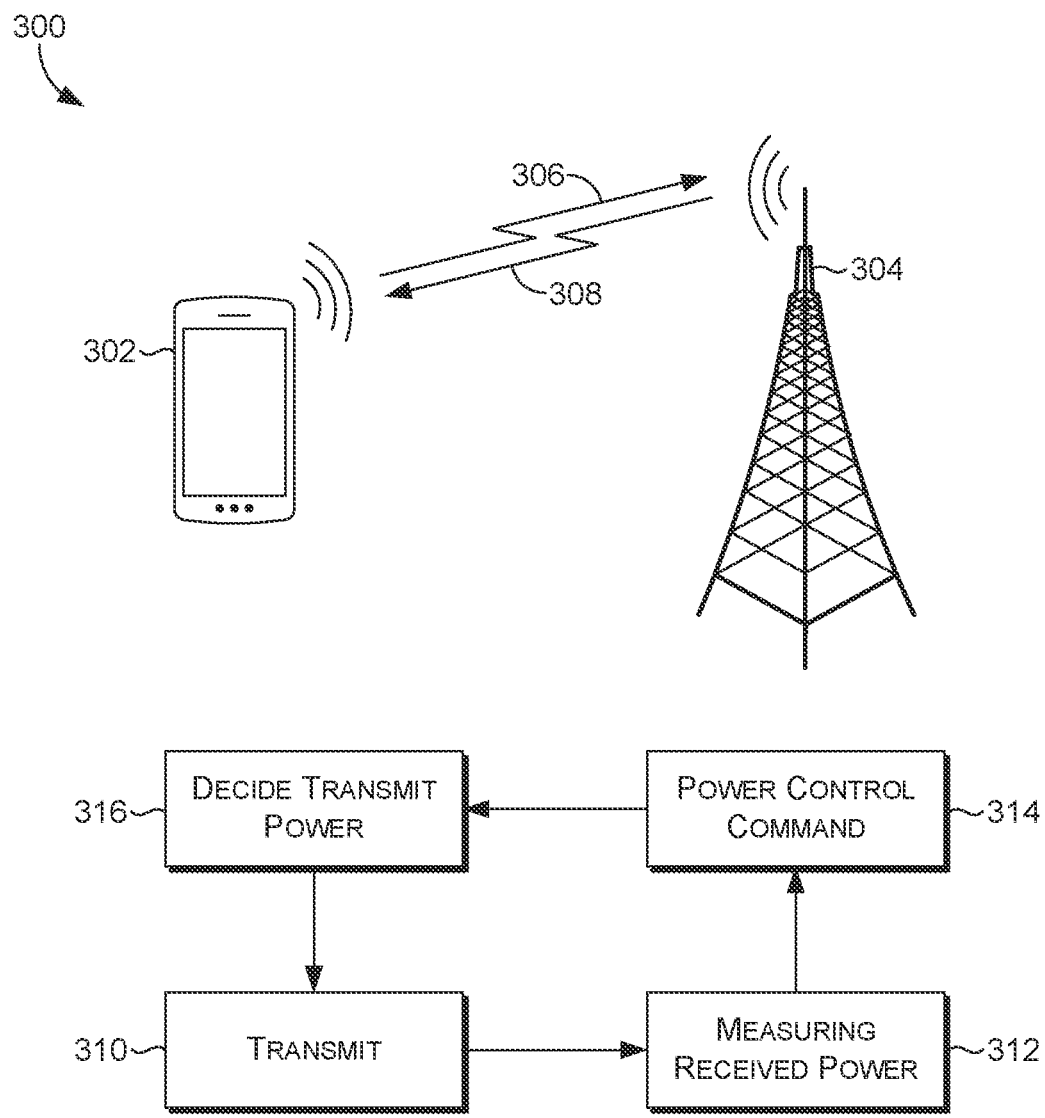
FIG. 3 depicts closed loop power control in an exemplary network environment, in which implementations of the present disclosure may be employed, in accordance with aspects herein.

FIG. 3 depicts closed loop power control in an exemplary network environment, in which implementations of the present disclosure may be employed, in accordance with aspects herein. FIG. 3 shows a system 300 that includes a UE 302 in communication with a base station 304. The UE 302 sends uplink communications 306 to the base station 304 and the base station 304 sends downlink communications, such as a downlink signal 308 to the UE 302. The downlink communications from the base station 304 can include power control commands.

Power control in 5G systems, such as that shown in FIG. 3, is used to solve what is known as the "near-far" problem. The goal of power control is to achieve the same power received from all the UEs served by the base station 304. In order for the base station 304 to receive the same power level from each UE, the UEs closer to the base station use less transmit power than the UEs further away.

In wireless networks, a significant challenge is adapting the transmit signal of the UE to overcome variations in signal condition of the channel. Transmit power of the UE is varied as channel quality changes in order to provide a fixed data rate. Uplink power control is used to limit intercell interference, as well as to reduce UE power consumption. Uplink power control is used to try to maintain a constant SINR at the base station. Closed loop power control uses feedback given by the base station to the UE. The base station issues transmit power control commands to the UE. In response the UE increases or decreases transmit power.

P0 nominal PUSCH is a design or optimization parameter that balances a trade-off between maximum UE uplink throughput and overall cell capacity. With a high P0 nominal PUSCH value a close-in UE with low radio frequency (RF) path loss can achieve high throughput per resource block because the SINR is high with respect to the resource block. UEs that can achieve P0 nominal PUSCH targets will transmit a higher power spectral density (PSD) or power per resource block. Higher power spectral density creates more co-channel interference for adjacent cells, resulting in lower maximum uplink capacity. When the P0 nominal PUSCH is lower, the maximum UE throughput is also lower because it is noise limited, that is, not as high a SINR per resource block, however, there is less co-channel interference. UEs at the cell edge are not affected as those UEs are likely already transmitting at maximum power.

Adjusting P0 nominal PUSCH is a balancing act on a network level to balance maximum uplink throughput, in excellent conditions, and total network capacity. Dynamically adjusting P0 nominal PUSCH can be based on a predetermined value, such as a SINR value. Each time the interference exceeds a predetermined threshold, the P0 nominal PUSCH value may be adjusted. The predetermined threshold may be based on a signal quality metric, such as SINR. For example, the predetermined threshold may be set at −20 dB, and when that threshold is met, a new value of P0 nominal PUSCH is implemented, resulting in recalculating the power levels for the UEs served by the base station. If the SINR value exceeds 0, then another P0 nominal PUSCH may be implemented.

FIG. 3 also illustrates the sequence of power commands. In block 310 a UE 302 transmits an uplink message to the base station 304. The uplink message sends the data on the physical uplink shared channel (PUSCH). The PUSCH carries the demodulation reference signals (DMRS), which are used in calculating the signal to noise and interference (SINR) value. The base station 304 measures the received power of the UE 302 uplink message in block 312. Based on whether the received power meets, exceeds, or is below a power threshold, the base station 304 may issue a power control command in block 314. Upon receipt of the power control command sent by the base station 304 the UE 302 decides the transmit power setting to be used for communications with the base station 304. The power control sequence described by blocks 310-316 can be repeated as many as 1000 times per second.

Figure 4:
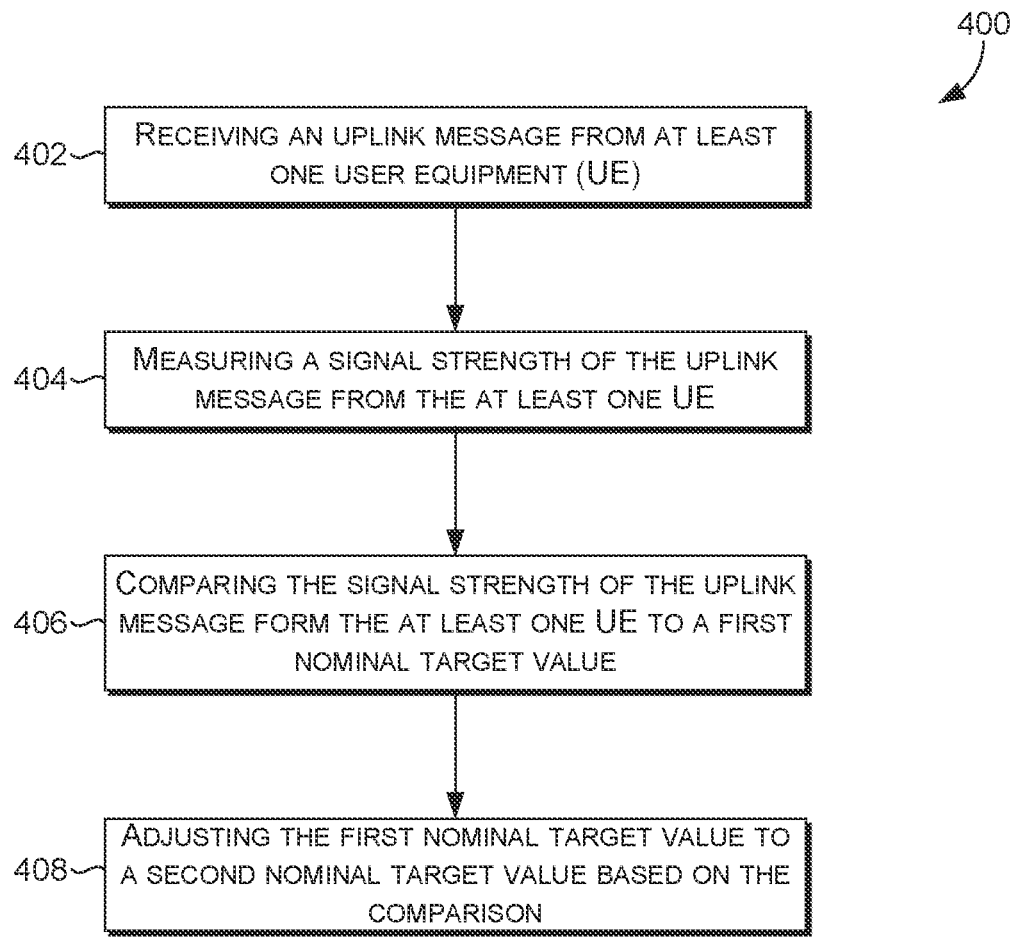
FIG. 4 is a flow diagram of an exemplary method for dynamic closed loop power control using a nominal target value, in which aspects of the present disclosure may be employed, in accordance with aspects herein.

FIG. 4 is a flow diagram of an exemplary method for dynamic closed loop power control using a nominal target value, in which aspects of the present disclosure may be employed, in accordance with aspects herein. The method 400 begins with receiving an uplink message from at least one user equipment (UE) device in step 402. The base station, such as the base station 304 of FIG. 3 receives the uplink message from a UE 302. Once the uplink message is received, the method continues with measuring a signal strength of the uplink message from the at least one UE device in step 404.

The method continues in step 406 with comparing the signal strength of the uplink message from the at least one UE device to a nominal target value. The nominal target value represents the level of the signal strength that assures that the nominal value is above the noise level, to ensure successful decoding. The base station can measure the noise level at its location. During the day, the noise level can fluctuate, which can render a nominal value less than optimal. To combat this, in step 408 the method continues with adjusting the nominal target value based on the comparison.

The method 400 updates the nominal value, which may be a P0 nominal physical uplink shared channel (P0 nominal PUSCH) value dynamically, based on the noise level at the base station. Then in step 408 the method continues with adjusting the nominal target value based on the comparison. The base station can adjust the P0 nominal PUSCH value based on the comparison. For example, if the P0 nominal PUSCH value is 0, then the base station may set a new P0 nominal PUSCH value. The base station can use measured noise at the base station in conjunction with the signal strength of the received uplink message to adjust the value of the nominal target value. Care is taken to ensure that the dynamically adjusted nominal target value ensures that the SINR is sufficiently above the noise level to ensure successful decoding. The base station can then direct the UEs to adjust power, either increase or decrease, accordingly. The base station may also adjust the number of resource blocks assigned to a UE based on the comparison, which can be useful if there is congestion in neighboring cell sites that is causing interference. A congestion metric can also be used to adjust the P0 nominal target value.

The dynamic adjustment of the closed loop power nominal target value can increase the probability of successful decoding of uplink messages at the base station. For the UEs, the ability to use less transmit power can optimize battery life.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamic closed loop power control, the method comprising:
    receiving an uplink message from at least one user equipment (UE);
    measuring a signal strength of the uplink message from the at least one UE;
    comparing the signal strength of the uplink message from the at least one UE to a first nominal target value, wherein the first nominal target value is a P0 nominal physical uplink shared channel (PUSCH) value; and
    adjusting the first nominal target value to a second nominal target value based on the comparison.

2. The method of claim 1, further comprising measuring a noise level at the receiver of the uplink message from the at least one UE.

3. The method of claim 2, wherein the noise level at the receiver of the uplink message is used in conjunction with the signal strength of the uplink message to adjust the first nominal target value.

4. The method of claim 2, wherein the at least one UE adjusts transmit power to increase transmit power when a noise level at the receiver of the uplink message is above a threshold.

5. The method of claim 2, wherein the at least one UE adjusts the transmit power to decrease transmit power when a noise level at the receiver of the uplink message is below a threshold.

6. The method of claim 1, wherein the signal strength of the uplink message uses a signal-to-noise and interference (SINR) measurement.

7. The method of claim 1, wherein the signal strength of the uplink message uses a congestion metric.

8. The method of claim 1, further comprising directing the at least one UE to adjust transmit power based on the second nominal target value.

9. A system for dynamic closed loop power control, comprising:
    a base station having one or more antennas for receiving uplink messages from at least one user equipment (UE), and a processor, the processor configured to:
    receive at least one uplink message from the at least one UE;
    measure at least one signal strength from the at least one uplink message;
    comparing the at least one signal strength to a first nominal target value; and
    adjusting a first nominal target value to a second nominal target value based on the comparison of the at least one signal strength to the first nominal target value, wherein the first nominal target value that is adjusted is a P0 nominal physical uplink shared channel (PUSCH) value.

10. The system of claim 9, further comprising measuring a received noise level of the uplink message at the base station.

11. The system of claim 10, wherein the received noise level at the base station is used in conjunction with the at least one signal strength of the uplink message to adjust the P0 nominal (PUSCH) value.

12. The system of claim 9, wherein the at least one signal strength of the uplink message uses a signal-to-noise and interference (SINR) measurement.

13. The system of claim 9, where the at least one signal strength of the uplink message uses a congestion metric.

14. The system of claim 13, further comprising directing the UE to increase or decrease transmit power based on the second nominal target value.

15. A non-transitory computer storage media storing computer-useable instructions that, when used by one or more processors, cause the processors to:
    transmit an uplink message from a user equipment (UE) to a base station, the uplink message including a signal strength; and
    receive, at the UE, a downlink message from the base station, the downlink message containing a transmit power control (TPC) command, wherein the TPC command is based on adjusting a P0 physical uplink shared channel PUSCH) value to an adjusted nominal target value.

16. The non-transitory computer storage media of claim 15, wherein the signal strength is a signal-to-noise and interference (SINR) measurement.

17. The non-transitory computer storage media of claim 15, wherein the adjusting of the P0 PUSCH value to the adjusted nominal target value is used to determine an increase or decrease the TPC power command.

* * * * *

UNITED STATES PATENT AND TRADEMARK OFFICE
CERTIFICATE OF CORRECTION

| | |
|---|---|
| PATENT NO. | : 12,432,661 B2 |
| APPLICATION NO. | : 17/960322 |
| DATED | : September 30, 2025 |
| INVENTOR(S) | : Gezim Krasniqi |

Page 1 of 1

It is certified that error appears in the above-identified patent and that said Letters Patent is hereby corrected as shown below:

In the Claims

Column 14, Claim 15, Line 46, please replace "channel PUSCH) value" with --channel (PUSCH) value--.

Column 14, Claim 17, Line 54, please replace "TPC power command." with --TPC command.--.

Signed and Sealed this
Eighteenth Day of November, 2025

John A. Squires
*Director of the United States Patent and Trademark Office*